(12) United States Patent
Nishi et al.

(10) Patent No.: US 7,821,952 B2
(45) Date of Patent: Oct. 26, 2010

(54) LOOP LOCATING APPARATUS AND LOOP LOCATING METHOD IN LAYER 3 NETWORK

(75) Inventors: Tetsuya Nishi, Kawasaki (JP); Tomonori Gotoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 898 days.

(21) Appl. No.: 11/500,848

(22) Filed: Aug. 8, 2006

(65) Prior Publication Data

US 2007/0230360 A1 Oct. 4, 2007

(30) Foreign Application Priority Data

Mar. 31, 2006 (JP) ............... 2006-099691

(51) Int. Cl.
*G01R 31/08* (2006.01)
*H04L 12/26* (2006.01)
(52) U.S. Cl. ...................... 370/249; 370/400
(58) Field of Classification Search .............. None
See application file for complete search history.

(56) References Cited

U.S. PATENT DOCUMENTS

| | | | | |
|---|---|---|---|---|
| 6,665,305 | B1 * | 12/2003 | Weismann | 370/401 |
| 6,810,021 | B1 * | 10/2004 | Sakurai | 370/255 |
| 2003/0101279 | A1 * | 5/2003 | Maheshwari | 709/241 |
| 2003/0152025 | A1 * | 8/2003 | Andersson et al. | 370/216 |
| 2004/0001485 | A1 * | 1/2004 | Frick et al. | 370/389 |
| 2005/0053016 | A1 * | 3/2005 | Kawai et al. | 370/254 |
| 2005/0286430 | A1 * | 12/2005 | Koga et al. | 370/241 |
| 2006/0013143 | A1 | 1/2006 | Yasuie et al. | |
| 2006/0171322 | A1 | 8/2006 | Lee | |
| 2007/0115961 | A1 * | 5/2007 | Dorenbosch et al. | 370/389 |

FOREIGN PATENT DOCUMENTS

| | | |
|---|---|---|
| JP | 1-223854 | 9/1989 |
| JP | 8-288982 | 11/1996 |
| JP | 2005534251 | 11/2005 |
| JP | 2006033277 | 2/2006 |
| WO | 2004012394 | 2/2004 |

OTHER PUBLICATIONS

Notice of Reasons for Rejection dated Jun. 8, 2010 for corresponding Japanese Application No. 2006-099691.

* cited by examiner

*Primary Examiner*—Chirag G Shah
*Assistant Examiner*—Salvador E Rivas
(74) *Attorney, Agent, or Firm*—Katten Muchin Rosenman LLP

(57) ABSTRACT

A loop locating apparatus and method enabling simple and fast identification of a Layer 3 loop fault occurring in a network, wherein, when the possibility of a Layer 3 loop is detected, a loop locating command function unit makes a packet transmission/reception function unit send a series of inspection packets (Pis) with successively incremented TTLs and monitors the return packets (te) of the inspection packets (Pis) by a return number counting function unit and wherein a loop location decision function unit finds the routers returning packets (te) with remarkably larger return numbers than the others and identifies the routers with return numbers over a predetermined threshold as the location of occurrence of the loop.

16 Claims, 17 Drawing Sheets

FIG.6

| SA#1 | NUMBER OF "TIME EXCEEDED" RECEIVED: — (1) |
|---|---|
| SA#2 | NUMBER OF "TIME EXCEEDED" RECEIVED: iF (4) |
| SA#3 | NUMBER OF "TIME EXCEEDED" RECEIVED: iF (4) |
| ⋮ | |
| SA#i | NUMBER OF "TIME EXCEEDED" RECEIVED: 0 |

42

RETURN COUNT

FIG.11
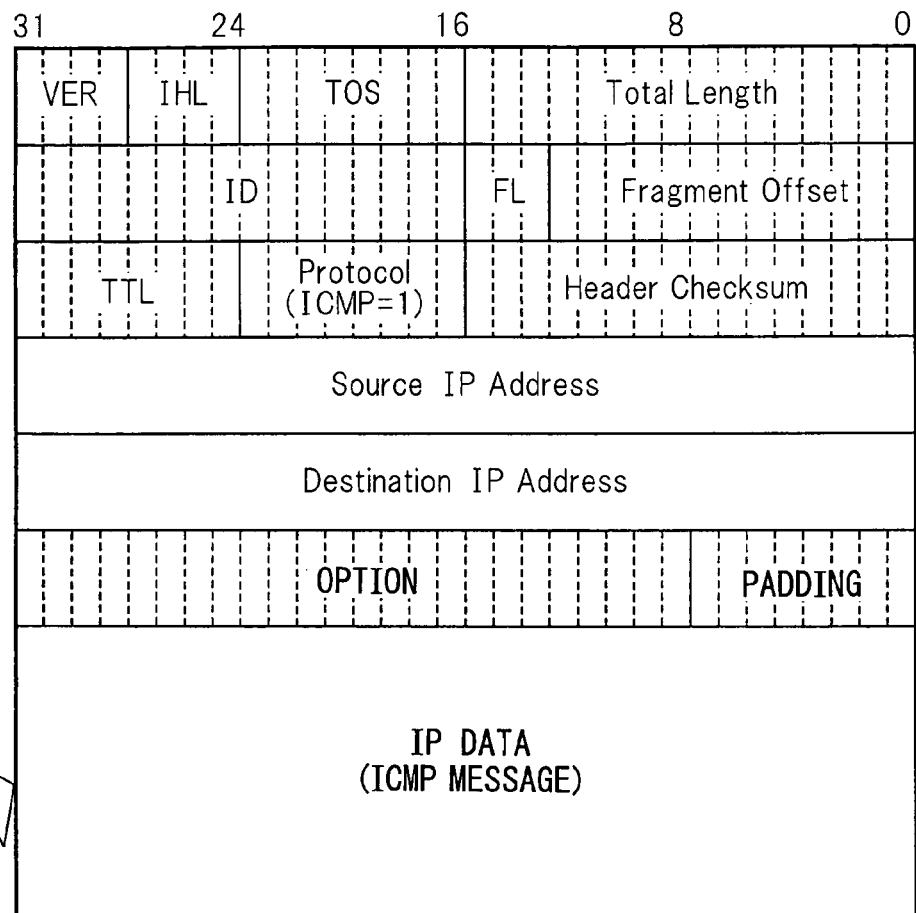
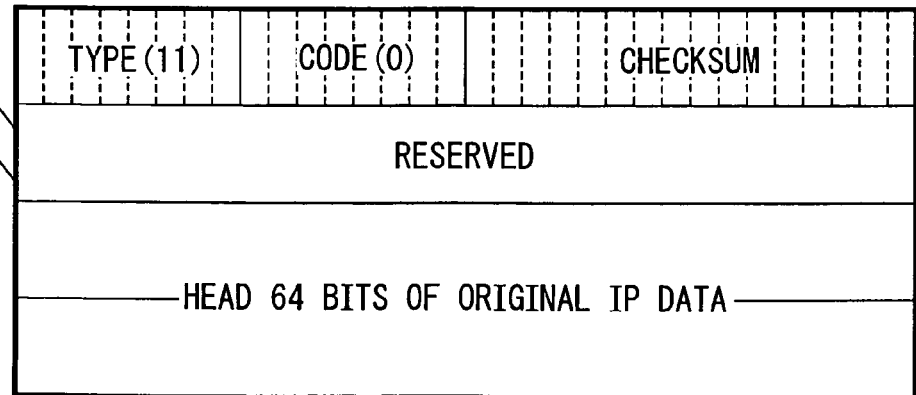

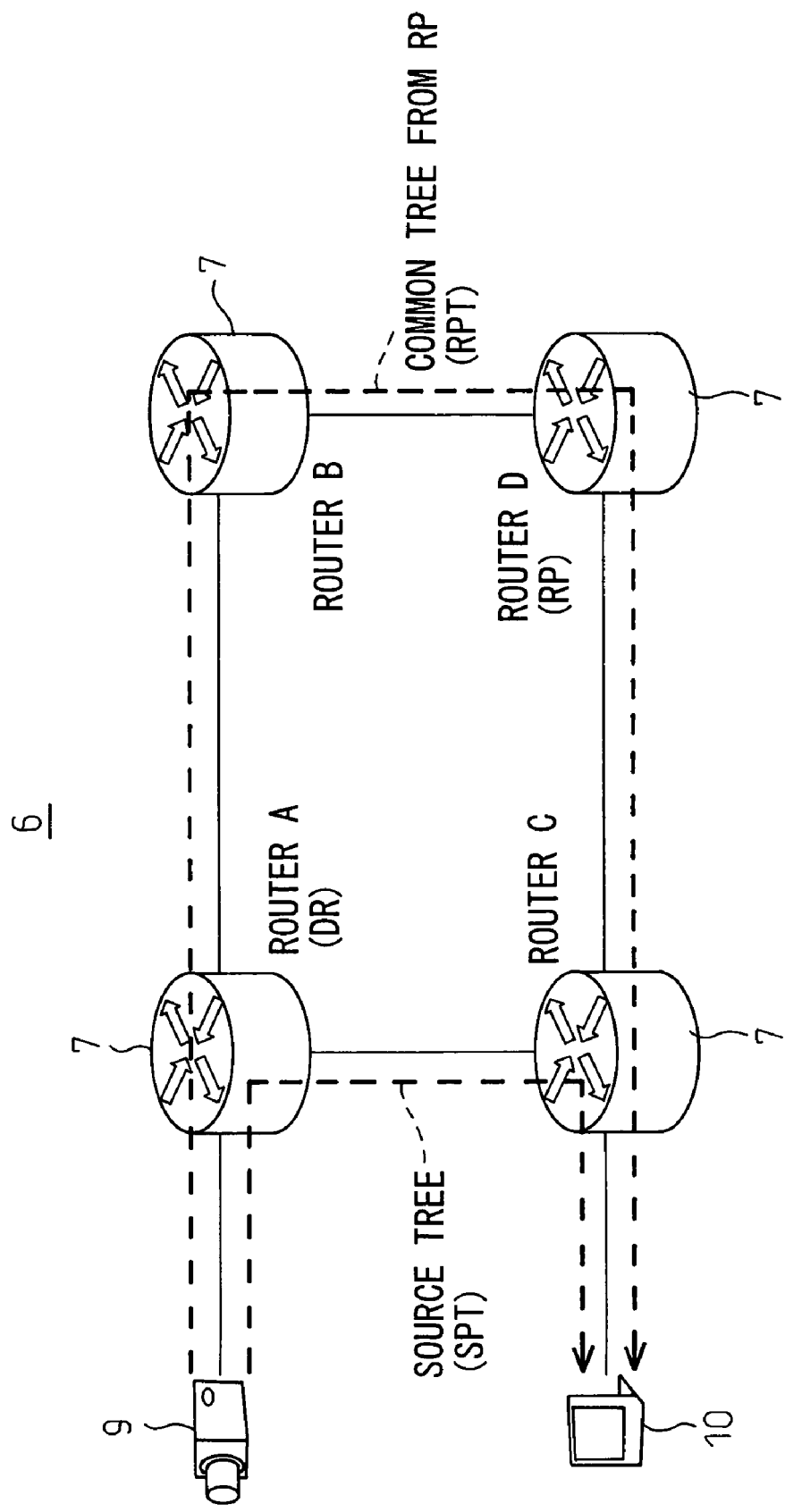

LOOP LOCATING APPARATUS AND LOOP LOCATING METHOD IN LAYER 3 NETWORK

BACKGROUND OF THE INVENTION

1. Field of the Invention

The present invention relates to a loop locating apparatus and loop locating method for identifying a location of occurrence of a fault occurring in an IP (Internet Protocol) network, for example, an IP Multicast Layer 3 Network including a plurality of routers, in particular a Layer 3 loop fault.

2. Description of the Related Art

As will be explained later with reference to the figures (FIG. 16), in an IP Multicast Layer 3 Network, sometimes a Layer 3 loop fault (hereinafter referred to simply as a "loop") occurs. This "loop" means the situation, when transmitting information packets by multicasting from one terminal to a plurality of terminals in a Layer 3 Network, where information packets end up traveling back and forth in a loop between two adjoining routers of the plurality of routers and are no longer forwarded to the terminals further on.

A leading cause of such a "loop" is an error in setting of the equipment in the routing tables in the two routers and the consequent failure of setting routing information for the information packets. In such a case, the two routers use the default routing information instead of the not set routing information. At this time, if the router A among the two routers A and B has default routing information to the path to the router B and the router B has default routing information to the path to the router A, the information packets attempting to pass through the routers A and B end up traveling back and forth between the routers A and B again and again leading to the occurrence of a loop.

If this happens, the information packets will end up disappearing after forming 256 loops since the TTL (Time to Live) setting is for example 256. Also, the multicast traffic will therefore become enormous. In the end, the network as a whole will be overloaded. Therefore, when detecting the occurrence of such a loop, it is necessary to quickly identify the location of occurrence of that loop and speedily eliminate the cause of the loop.

As known art relating to the present invention, there are Japanese Patent Publication (A) No. 8-288982 and Japanese Patent Publication (A) No. 1-223854. Japanese Patent Publication (A) No. 8-288982 discloses a "relay communication system" which detects information on the remaining permissible number of relay operations, a value which corresponds to the TTL, and suspends relay operations of the data when the number reaches "0". Further, Japanese Patent Publication (A) No. 1-223854 discloses a "test method for a data transmission system" which transmits a test frame to a network transmission system, analyzes a test response frame received back, checks if a response as expected is returned, and if the response is as expected, judges that operation is normal.

Therefore, neither of the above patent publications suggests at all the later explained characterizing feature of the present invention, that is, "sending a series of inspection packets with successively incremented TTLs to a network and analyzing the packets returned from the network to the source of the packets so as to identify the location of occurrence of the loop".

As a general technique for identifying the location of occurrence of a loop, there is the "traceroute". As explained later with reference to the figures (FIG. 17), however, when a multicast stream loops, the situation is sometimes different from a unicast route and therefore the "traceroute" technique sometimes cannot determine the correct route.

Therefore, in the past, the practice has been to log in to each router by a Telnet etc. and individually collect the setting information relating to the multicast. Accordingly, since the method of setting each piece of equipment differs, there was the first problem that it was necessary to know how to confirm the setting information for all of the equipment.

Further, it was necessary to collect the setting information for the equipment from all of the routers for each individual multicast address and to manually confirm the multicast route. For this reason, there was the second problem that tremendous time was required for identifying the location of occurrence of a loop fault.

SUMMARY OF THE INVENTION

An object of the present invention is to provide a fast, simple technique for detecting the occurrence of a Layer 3 loop and identifying the location of occurrence To attain the above object, according to the present invention, when the possibility of a Layer 3 loop is detected, a loop locating command function unit (2) makes a packet transmission/reception function unit (3) send a series of inspection packets Pis with successively incremented TTLs and monitors the return packets te of the Pis by a return number counting function unit (4). A loop location decision function unit (5) finds the routers with remarkably larger return numbers of the packets te than the others and identifies the routers with return numbers over a predetermined threshold as the location of occurrence of the loop.

BRIEF DESCRIPTION OF THE DRAWINGS

These and other objects and features of the present invention will become clearer from the following description of the preferred embodiments given with reference to the attached drawings, wherein:

FIG. 6 is a view of the content of a table 42 relating to FIG. 2;

FIG. 11 is a second part of a view of the format of an ICMP "time exceeded" packet;

FIG. 17 is a view illustrating that a multicast route and a unicast route are sometimes different.

DESCRIPTION OF THE PREFERRED EMBODIMENTS

Preferred embodiments of the present invention will be described in detail below while referring to the attached figures.

Figure 1:
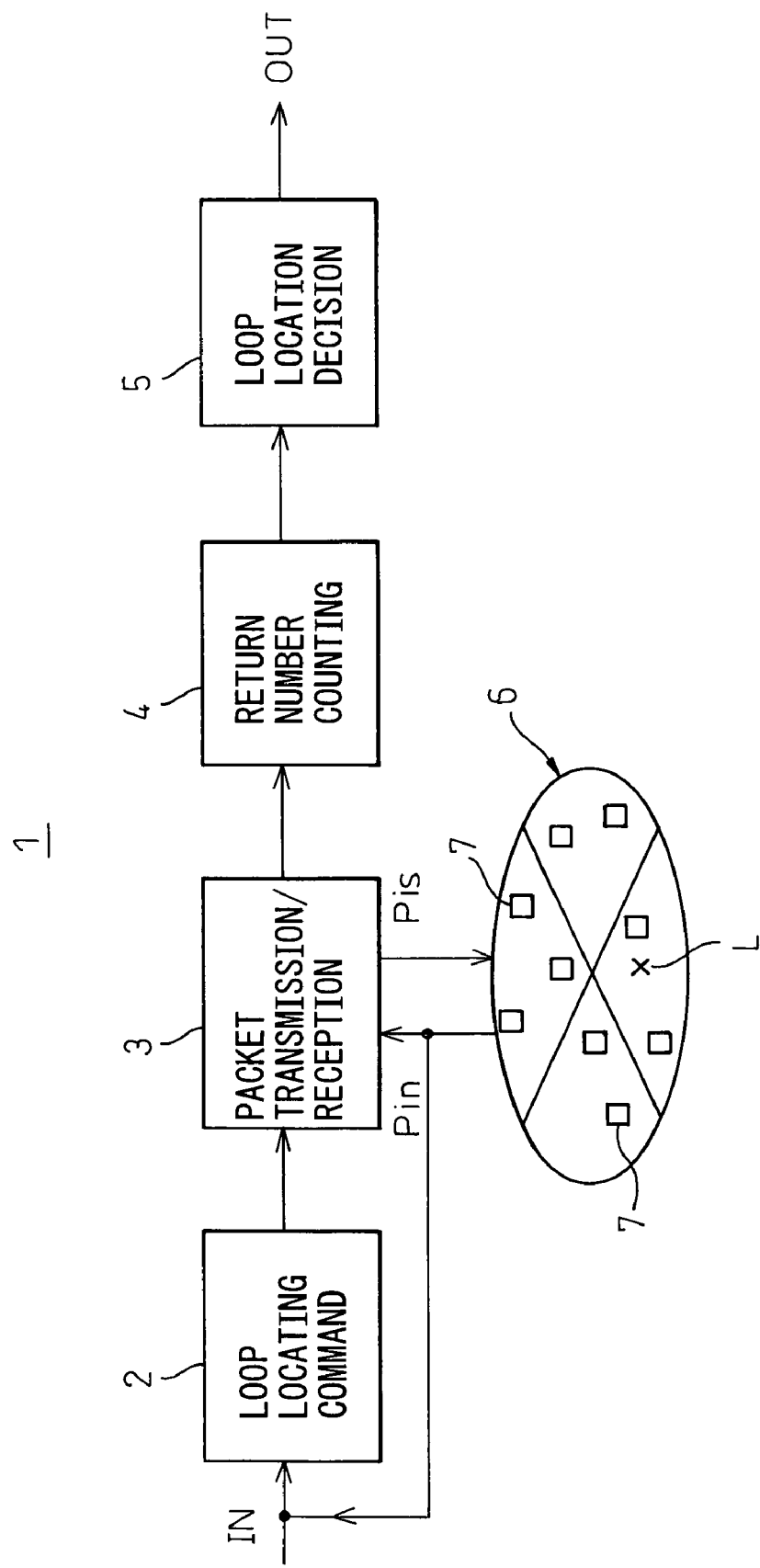
FIG. 1 is a view of the basic configuration of the present invention.

FIG. 1 is a view of the basic configuration of a loop locating apparatus according to the present invention. In the figure, reference numeral 1 indicates a loop locating apparatus according to the present invention. As illustrated, this is comprised of a loop locating command function unit 2, a packet transmission/reception function unit 3, a return number counting function unit 4, and a loop location decision function unit 5. Among these function units, the packet transmission/reception function 3 is linked with a Layer 3 network 6. The network 6 has a plurality of routers 7.

That is, the loop locating apparatus 1 according to the present invention is an apparatus for identifying the location of a Layer 3 loop occurring in a Layer 3 network 6 including a plurality of routers 7. Here, the functions of the function units 2 to 5 are as follows:

1) The loop locating command function unit 2 instructs the identification of the location of occurrence of the Layer 3 loop, 2) the packet transmission/reception function unit 3 transmits at least a series of inspection packets Pis (inspection) for identifying the location of occurrence of the Layer 3 loop L in accordance with that command or receives input packets Pin (input) from the Layer 3 network 6, 3) the return number counting function unit 4 cumulatively counts, for each of the plurality of routers 7, the return number of input packets Pin corresponding to the inspection packets Pis returned from each router 7, and 4) the loop location decision function unit 5 confirms that the Layer 3 loop has occurred by referring to the cumulative return number of each router 7 counted by the return number counting function unit 4 and identifies the routers of the location of occurrence.

Note that IN in the figure indicates the cause triggering the loop locating command, while OUT in the figure indicates the result of identification of the location of occurrence of the loop.

As will be clear from the following explanation, according to the present invention, by just successively forming a predetermined number of inspection packets Pis substantially the same as usual information packets and sending them over a network 6, it is possible to start a search for a loop fault. Thereafter, by just analyzing the input packets Pin corresponding to the series of inspection packets Pis, that is, the return packets, it is possible to identify the location of occurrence of the loop. That is, an extremely simple "loop locating" technique is realized.

Further, the time from when starting to send the series of inspection packets Pis to when receiving the input packets Pin (return packets) corresponding to the series of inspection packets and finishing analyzing the return packets is very slight, therefore a fast "loop locating" technique is realized.

In this case, it is possible to correctly identify the loop without regard as to whether the transmission is a multicast or unicast. There is no need to learn the setting information for all equipment (routers).

Figure 16:
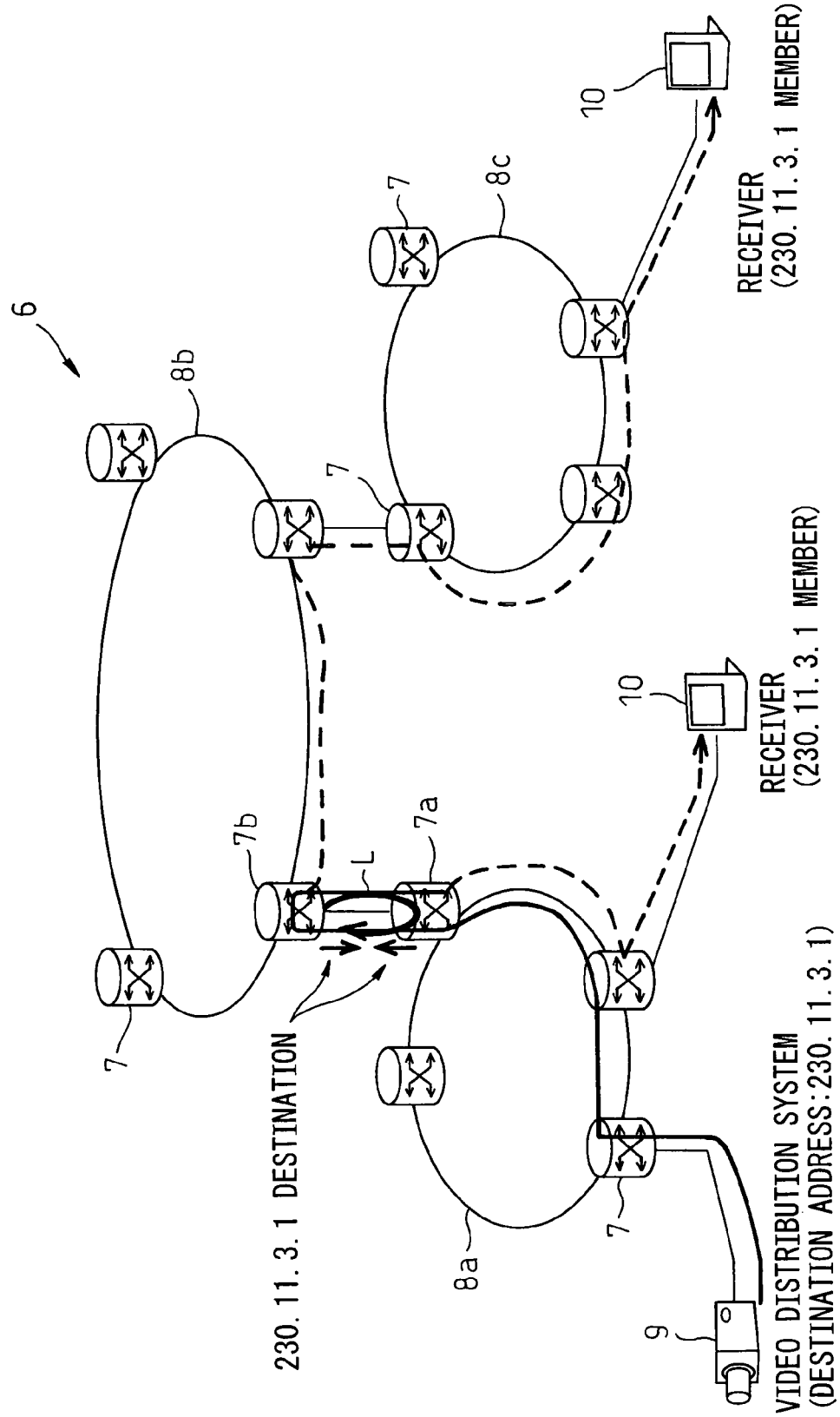
FIG. 16 is a view of the state of occurrence of a Layer 3 loop fault.

To clarify the effects of the present invention, the previously mentioned FIG. 16 and the previously mentioned FIG. 17 will be first explained.

FIG. 16 is a view showing an example of the situation where a Layer 3 loop (L) fault occurs. Note that throughout the drawings, similar components are assigned the same reference numerals or symbols.

In FIG. 16, the Layer 3 network 6 shown in the example of the drawing is comprised of three subnetworks 8*a*, 8*b*, and 8*c*. According to this figure, a router 7*a* of the subnetwork 8*a* and a router 7*b* of a subnetwork 8*b* are sent a multicast from a sending terminal (in one example, a video distribution system) 9 by an error in setting of the equipment (routers). The video information packets therefore do not reach each receiving terminal (receiver member) 10. This is because, as already explained, the routing information to the receiving terminals 10 is not set, so the Layer 3 loop occurs due to the already explained default routing information. Further, due to this, the traffic greatly increases.

Therefore, if using the previous explained general "traceroute" technique to search for the loop L, as explained above, when a multicast stream suffers from a loop fault, there is sometimes a difference from a unicast route, so constant determination of the correct route is difficult.

FIG. 17 is a view illustrating the case when a multicast route and a unicast route differ. The route from the sending terminal 9 to the receiving terminal 10 is usually, in the case of a unicast route, the router A->router C and, in the case of a multicast route as well, usually the same route. However, in the case of a multicast, the route of the router A->router B->router D->router C is also sometimes adopted. Therefore, the route is not necessarily the same as that of unicast routing. Accordingly, there is no guarantee that the loop L will be correctly found. Note that in the figure, the abbreviations have the following meanings:

DR: Designated Router
RPT: Rendezvous Point Tree
SPT: Shortest Path Tree

Eliminating the above defects when searching for the location of occurrence of the Layer 3 loop L shown in FIG. 16 by the conventional "traceroute" technique shown in FIG. 17 is the object of the present invention. To achieve this object, the present invention proposes a loop locating apparatus 1 having the basic configuration shown in FIG. 1. The basic configuration of FIG. 1 will be explained in more detail below.

Figure 2:
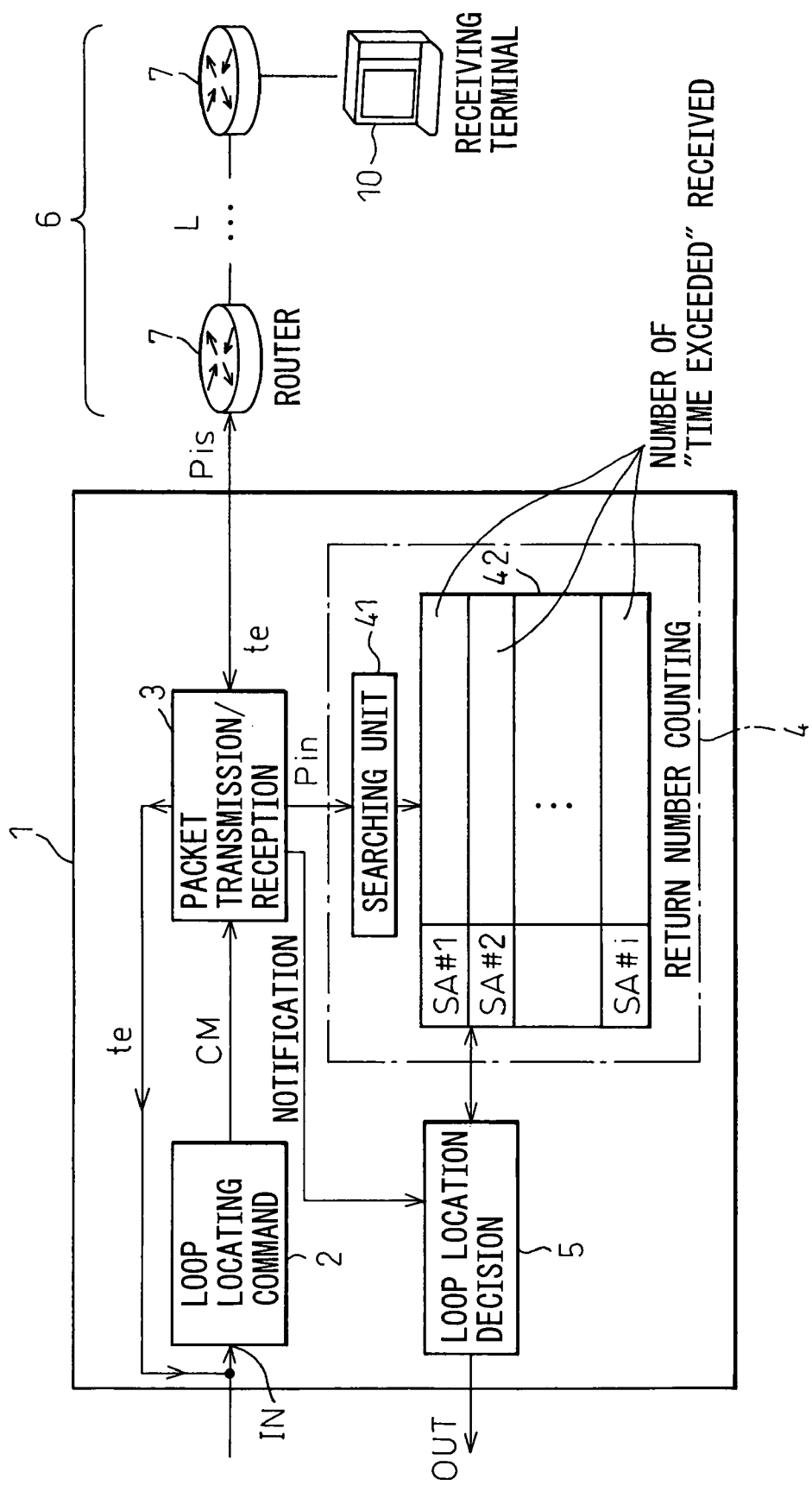
FIG. 2 is a view of a more specific example of the basic configuration of FIG. 1.

FIG. 2 is a view of a more specific example of the basic configuration of FIG. 1. In the figure, reference numerals 1 to 6 correspond to the components 1 to 6 shown in FIG. 1.

First, the loop locating command function unit 2 sends a command CM for starting the operation for locating the Layer 3 loop in the loop locating apparatus 1 as the above command. Receiving the command CM, the packet transmission/reception function unit 3 generates inspection packets Pis and sends them to the Layer 3 network 6 side. Further, the return number counting function unit 4 analyzes the return packets corresponding to these inspection packets Pis, that is, the input packets Pin, while the loop location decision function unit 5 identifies the location of occurrence of the Layer 3 loop in the network 6 causing the return packets and notifies the result OUT to for example the operator to have that loop quickly repaired.

In realizing the process for identifying the location of occurrence of the Layer 3 loop explained above, it is necessary to specially modify the configuration of the inspection packets Pis. These modifications will be explained later, but explaining an example of the most suitable modification first, a series of N number (N being an integer less than 256) of inspection packets Pis with successively incremented TTL settings, for example, TTL=1->2->...N, is sent to the Layer 3 network 6 side.

On the other hand, the sent inspection packets Pis are returned at the Layer 3 loop L to become the above return packets. These return packets are returned to the packet transmission/reception function unit 3 where they become input packets to the return number counting function unit 4. More specifically, the return number of input packets Pin returned through the searching unit 41 at the table 42 is counted as the "number of time exceeded received" for each router 7 (in the figure, shown as the source address SA). In conclusion, the routers with return numbers relatively standing out are identified as the routers of the source of the Layer 3 loop L.

Looking one more time here at the loop locating command function unit 2, there are various causes of issuance of the above command CM, that is, triggers for issuing the above command. These will be explained in detail next.

The loop locating command function unit 2 receives communication confirmation packets for a predetermined plurality of receiving terminals 10 at substantially periodic intervals for confirmation of communication. When judging from the return packets that a Layer 3 loop might have occurred, it issues a command to the packet transmission/reception function unit 3 to send the above series of inspection packets Pis (command CM).

Figure 3:
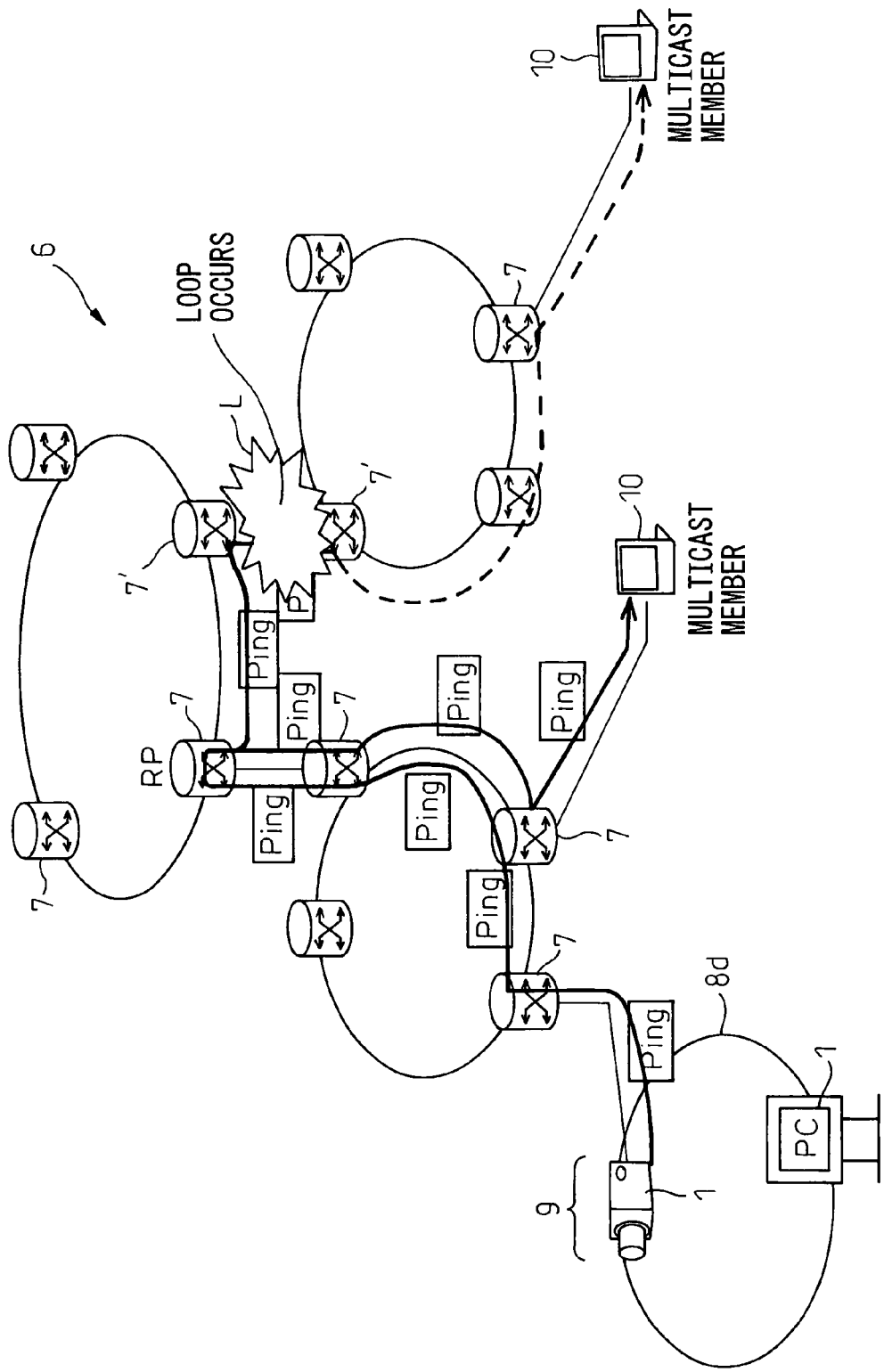
FIG. 3 is a view of an example of a communication confirmation process triggering loop detection.

In a first example, the communication confirmation packet is a multicast ping (Packet Inter Net Groper) (see FIG. 3). In a second example, the communication confirmation packet is an RTCP (Real time Transport Control Protocol) packet (see FIG. 15).

Figure 4:
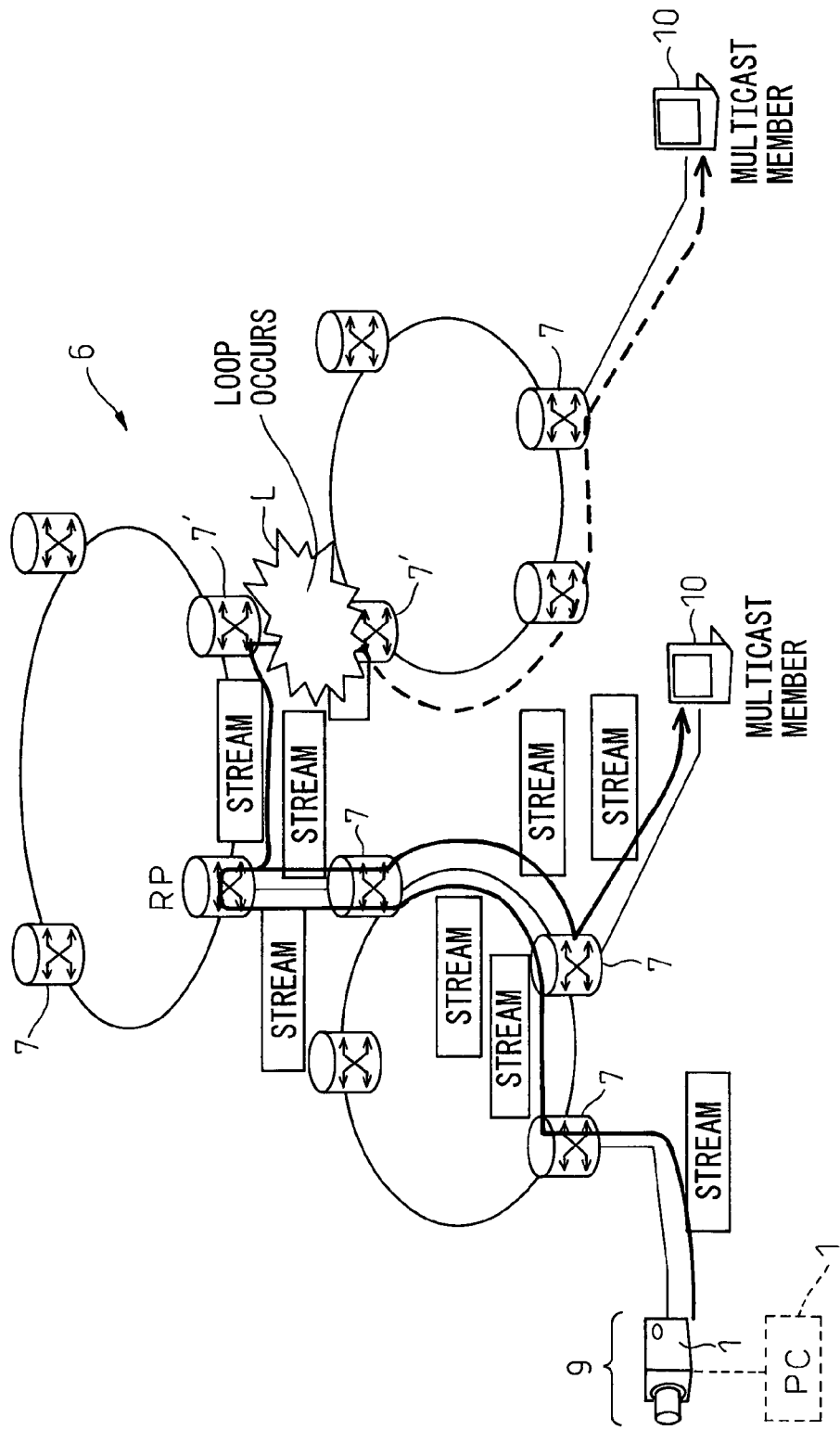
FIG. 4 is another view of an example of a communication confirmation process triggering loop detection.

Further, in a third example, when the loop locating command function unit 2 judges that a Layer 3 loop L may have occurred from the return packets returned while sending stream data packets originally to be transferred, it issues a command to the packet transmission/reception function unit 3 to send the above series of inspection packets Pis (command CM) (see FIG. 4).

FIG. 3 is a view of an example of the communication confirmation process triggering loop detection. In the figure, a loop locating apparatus 1 provided in the sending terminal 9 constituted by a video distributing system (camera) sends a multicast ping to the receiving terminals 10 concerned. Note that in the unicast state, it sends this to a predesignated receiving terminal 10. If the Layer 3 network 6 is normal, so-called echo replies are returned from the terminals 10. Alternatively, there is no response.

However, when, as shown in the figure, the network 6 is abnormal and a Layer 3 loop L occurs, an ICMP (Internet Control Message Protocol) "time exceeded" packet is returned from the router 7' to the apparatus 1. The return of such a "time exceeded" packet (see "te" of FIG. 2) may be used to trigger loop detection. The loop locating apparatus 1 therefore issues the above command (command CM).

Note that the loop locating apparatus 1 may be formed inside the video distributing system (camera) 9 or may be formed by a PC terminal provided in the same sub network 8d (FIG. 3) as the video distributing system 9.

FIG. 4 is a view of another example of the communication confirmation process triggering loop detection. In the figure, the sending terminal 9 constituted by the video distributing system (camera) executes an application such as sending a video stream "stream" or VOIP etc. If a Layer 3 loop occurs along with this, at that time an ICMP "time exceeded" packet is returned as "te" of FIG. 2 to the apparatus 1 as the aforementioned return packet. This can be used to trigger loop detection.

Next, referring to FIG. 5 and FIG. 6, the loop locating apparatus 1 (shown by an example built-in the sending terminal 9) will be explained in further detail.

Figure 5:
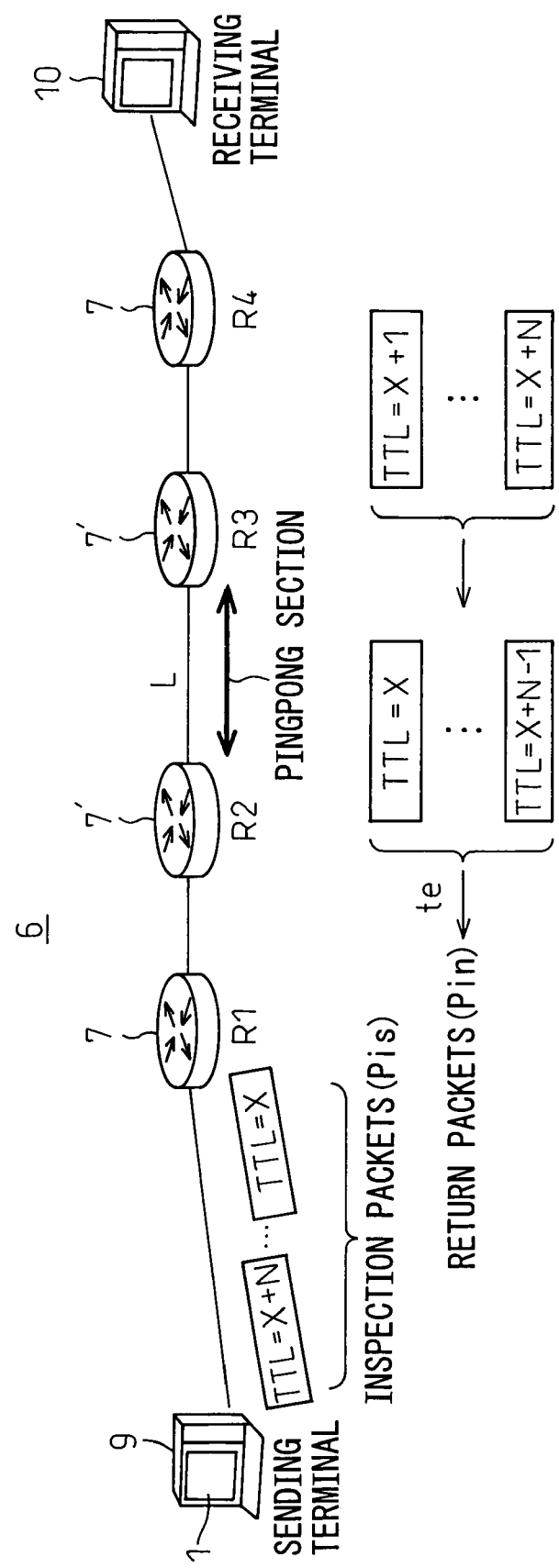
FIG. 5 is a view of the relationship between inspection packets and return packets in the present invention.

FIG. 5 is a view of the relationship between inspection packets and return packets in the present invention. FIG. 6 is a view of the content of the table 42 (FIG. 2) associated with FIG. 2. First, referring to FIG. 5 together with FIG. 2, the series of inspection packets Pis sent from the packet transmission/reception function unit 3 in the loop locating apparatus 1 (FIG. 2) consists of IP (Internet Protocol) packets with successively incremented TTL (Time to Live) settings. On the other hand, the input packets Pin received by the packet transmission/reception function unit 3 are a series of ICMP (Internet Control Message Protocol) "time exceeded" packets corresponding to the series of IP packets (Pis).

The values of TTL in the IP packets (inspection packets Pis) are set to 1 to K (K is an integer of 2 to less than 256) as default values or are set to incremental values expressed by X+N. Here, X is any fixed integer, N is an integer incremented one by one, and X+N is an integer less than 256. Note that this X may be freely set when desiring to restrict the setting of TTL to a suitable range as the range of inspection.

Referring to FIG. 5, as explained above, the series of inspection packets Pis set to TTL=X to X+N is sent from the loop locating apparatus 1 in the sending terminal 9 (FIG. 2).

This being the case, a large number of ICMP "time exceeded" packets (te) are returned from the two routers 7' (shown by R2 and R3) causing the Layer 3 loop fault (L) to the loop locating apparatus 1. These are received as return packets at the packet transmission/reception function unit 3 where they are treated as input packets Pin (FIG. 2).

The large amount of "time exceeded" packets "te" are caused by the following process. In FIG. 5, first, the packet te corresponding to the inspection packet Pis with the TTL=1 is returned from the router R1 of FIG. 5 to the loop locating apparatus 1. Next, the packet te corresponding to the packet Pis with the TTL=2 is returned to the apparatus 1 from the router R2 with the loop fault. Further, the router R2 receiving the packet Pis with the TTL=3 has the router R3 designated as the default (assumed to be predesignated in this way). This packet Pis (TTL=3) is transferred to the router R3. In response to this, the router R3 returns the packet Te to the apparatus 1.

Further, the packet Pis with the TTL=4 passes through the router 2, becomes TTL=2, reaches the router R3, becomes TTL=1, and returns to the router R2. This router R2 returns the packet te to the apparatus 1. This loop like back and forth transfer of the packet Pis is shown in FIG. 5 as the "pingpong section".

The "time exceeded" packets te corresponding to the series of inspection packets Pis with TTLs successively set to TTL=5, TTL=6, TTL=7 . . . TTL=256 (in the case of the default setting) are all looped back after going through the pingpong operation in the pingpong section, are received by the packet transmission/reception function unit 3 of the loop locating apparatus 1, and are sent as the input packets Pin to the return number counting function unit 4. That is, the packet transmission/reception function unit 3 (FIG. 2) successively transfers the series of input packets Pin successively received to the return number counting function unit 4.

Note that the packet transmission/reception function unit 3 (FIG. 2) can notify the loop location decision function unit 5 (FIG. 2) that the operation for decision of the loop location should be started when receiving the series of input packets Pin ("notification" of FIG. 2). Alternatively, instead of the end "notification", it is also possible to give a "start" notification of the inspection packets Pis. The loop location decision function unit 5 can start the above loop location decision operation after the elapse of a predetermined time from receiving the notification "start" from the function unit 3 (after the elapse of the time required for finishing transmission of the series of inspection packets Pis). Note that the function unit 5 will be explained in detail later.

Here, referring to the already explained FIG. 6, the ICMP "time exceeded" packets te successively returned from the routers (R1, R2 . . . ) by the process explained in FIG. 5 are successively recorded in the table 42 shown in FIG. 6 as the input packets Pin. The number of inputs is also recorded together (see "return count" of FIG. 6). This table 42 is based on the example of the loop search of FIG. 5. The return numbers of the "time exceeded" packets te from the router R2 (source address SA#2) and router R3 (source address SA#3) are outstandingly large. These return number counting operations are performed by the return number counting function unit 4 shown in FIG. 2, so this function unit 4 will be explained in a little more detail.

In FIG. 2, the return number counting function unit 4 analyzes the input packets Pin successively transferred from the packet transmission/reception function unit 3. Further, provision is made of a searching unit 41 for finding the source address (SA) of the source sending the ICMP "time exceeded" packet forming each input packet Pin from the source address (SA) contained in the Pin. Further, a table 42 for entering the source addresses (SA) found (FIG. 6) is included. In the table 42, the return number is incremented for each router (R1, R2, R3 . . . ) ("return count" of FIG. 6).

Explaining the operation between the searching unit 41 and table 42 in some more detail, when the source address (SA) found by the searching unit 41 is not in the table 42, the source address (SA) is newly entered into the table 42. On the other hand, when the source address (SA) found by the searching unit 41 is already entered in the table 42, the above return number is increased by exactly "1" at that source address (SA) ("return count" of FIG. 6).

Therefore, the table 42 storing the counted return number of the ICMP "time exceeded" packets te, that is, the input packets Pin, is referred to by the loop location decision function unit 5 of FIG. 2 for judgment by a predetermined judgment operation. The result OUT, that is, the identification of the location of occurrence of the loop L, is generated. In this way, the loop location decision function unit 5 refers to the cumulative return number shown by the table 42 ("return count" of FIG. 6) and judges that the Layer 3 loop L has occurred at the routers (R1, R2, R3 . . . ) corresponding to the source address (SA#1, SA#2 . . . ) with relatively larger cumulative return numbers than the rest.

More specifically, the loop location decision function unit 5 decides that the Layer 3 loop L has occurred at two or more routers when there are two or more routers corresponding to source addresses (SA) with relatively large cumulative return numbers (see R2 and R3 of FIG. 5 and SA#2 and SA#3 of FIG. 6) and identifies the two or more routers (R2, R3) relating to the Layer 3 loop.

More preferably, the loop location decision function unit 5 confirms that the Layer 3 loop L occurred at two or more routers when judging that the above cumulative return number exceeds a predetermined threshold value (for example "10") and identifies the two or more routers relating to the Layer 3 loop L. By doing this, the precision of determination is further improved.

Above, the explanation was given focusing on the hardware configuration of the Layer 3 loop fault search according to the present invention centering on FIG. 2, but the Layer 3 loop fault search of the present invention may also be grasped as a method invention.

Figure 7:
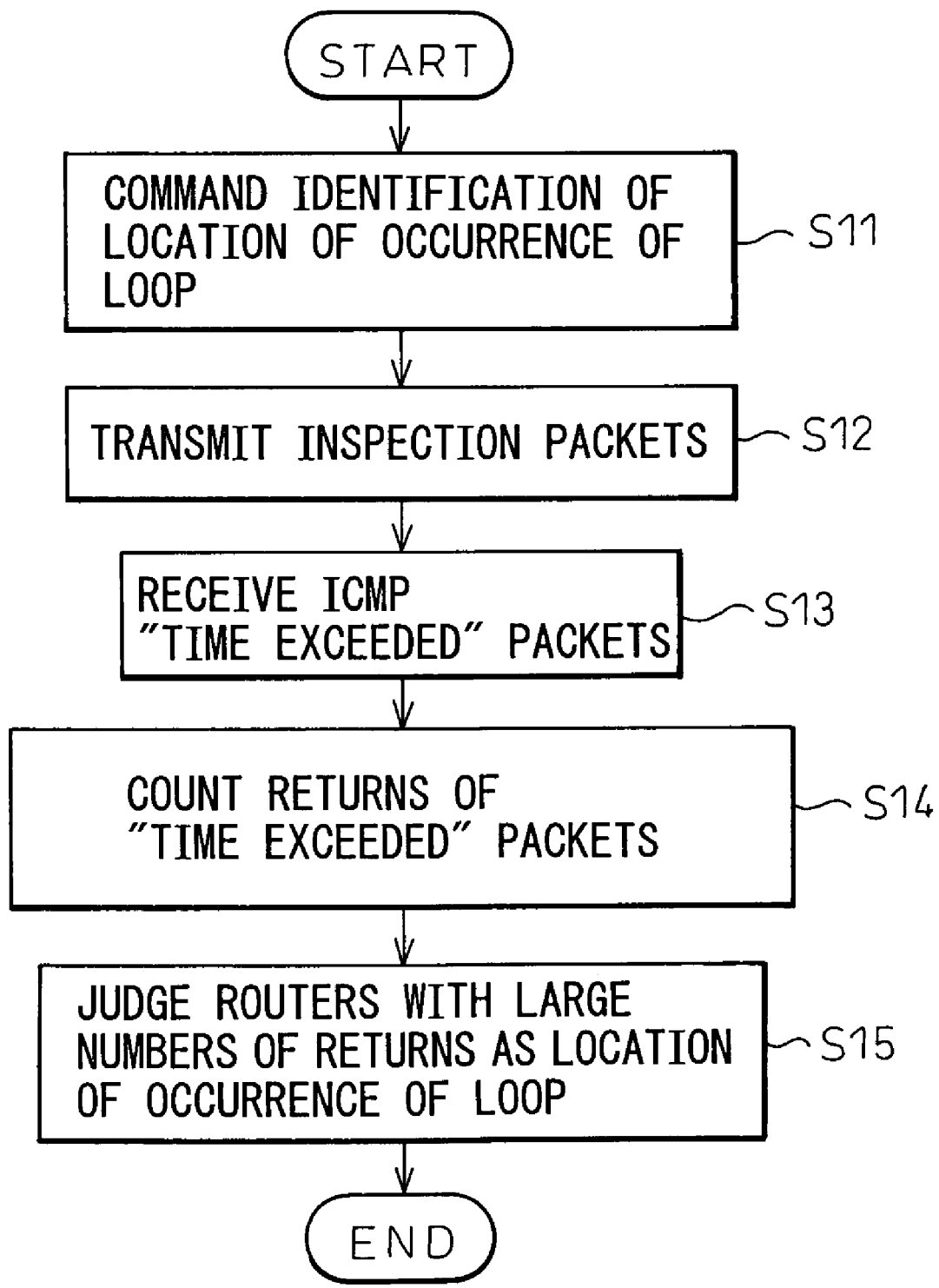
FIG. 7 is a flow chart of the basic steps of a method of locating a loop according to the present invention.

FIG. 7 is a flow chart of the basic steps of a loop locating method according to the present invention. As shown in the figure, this loop locating method is comprised of a command step S11, a transmission step S12, a reception step S13, a count step S14, and a judgment step S15. Details are given below:

In the command step S11, the inability of an IP packet sent to the Layer 3 network 6 to reach its destination is detected and a command is issued to identify the location of occurrence of the Layer 3 loop L. At the transmission step S12, a series of IP packets with successively incremented TTLs is sent as the inspection packets Pis of the Layer 3 loop L.

At the reception step S13, a series of ICMP (Internet Control Message Protocol) "time exceeded" packets "te" returned in response to the inspection packets Pis and corresponding to the series of IP packets is received. At the count step S14, the source address SA of the ICMP "time exceeded" packet "te" received is found from each ICMP "time exceeded" packet and the number of the ICMP "time exceeded" packets returned for each same source address SA is cumulatively counted.

Figure 8:
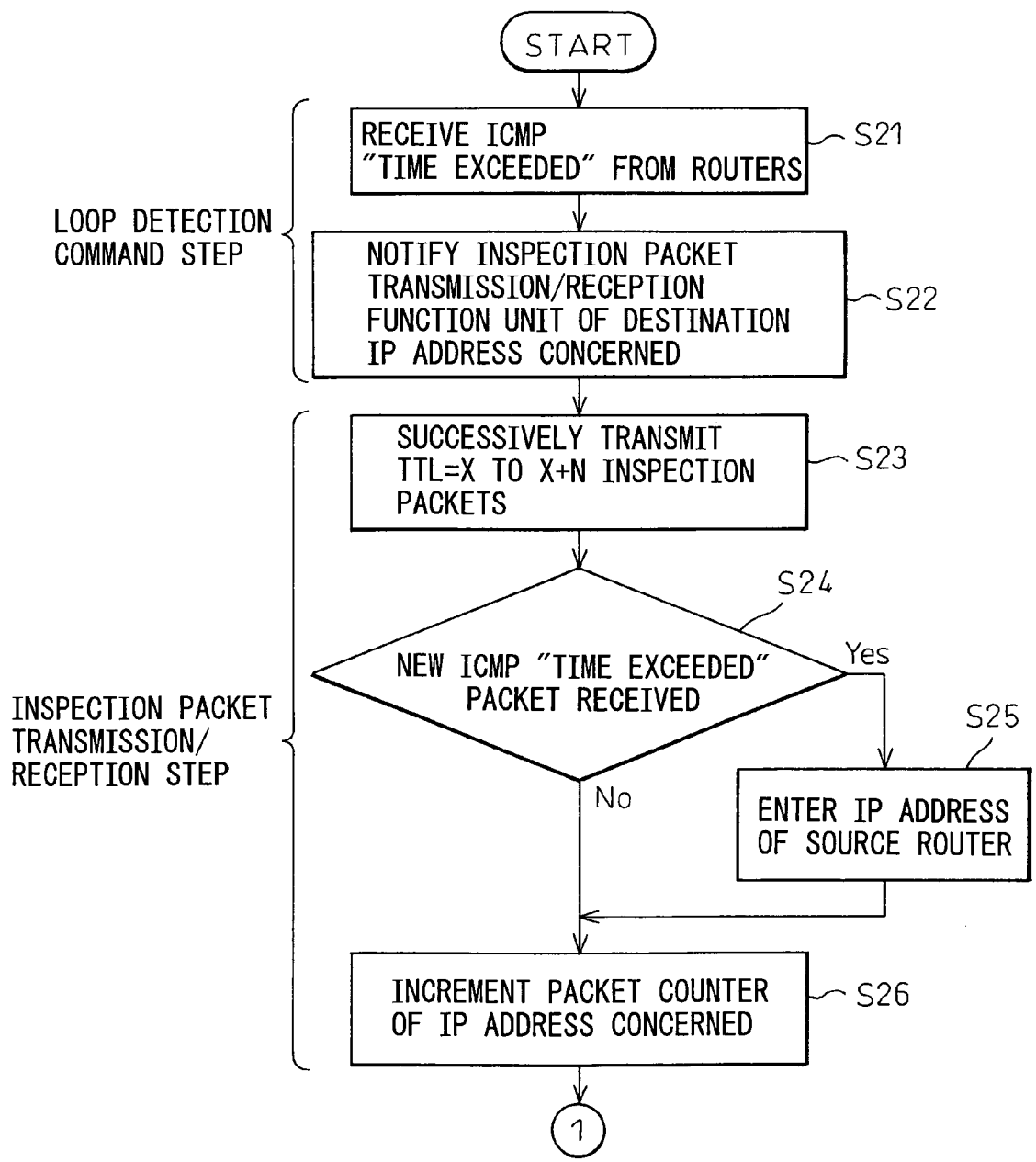
FIG. 8 is a first part of a flow chart of an example of the specific steps based on FIG. 7.
Figure 9:
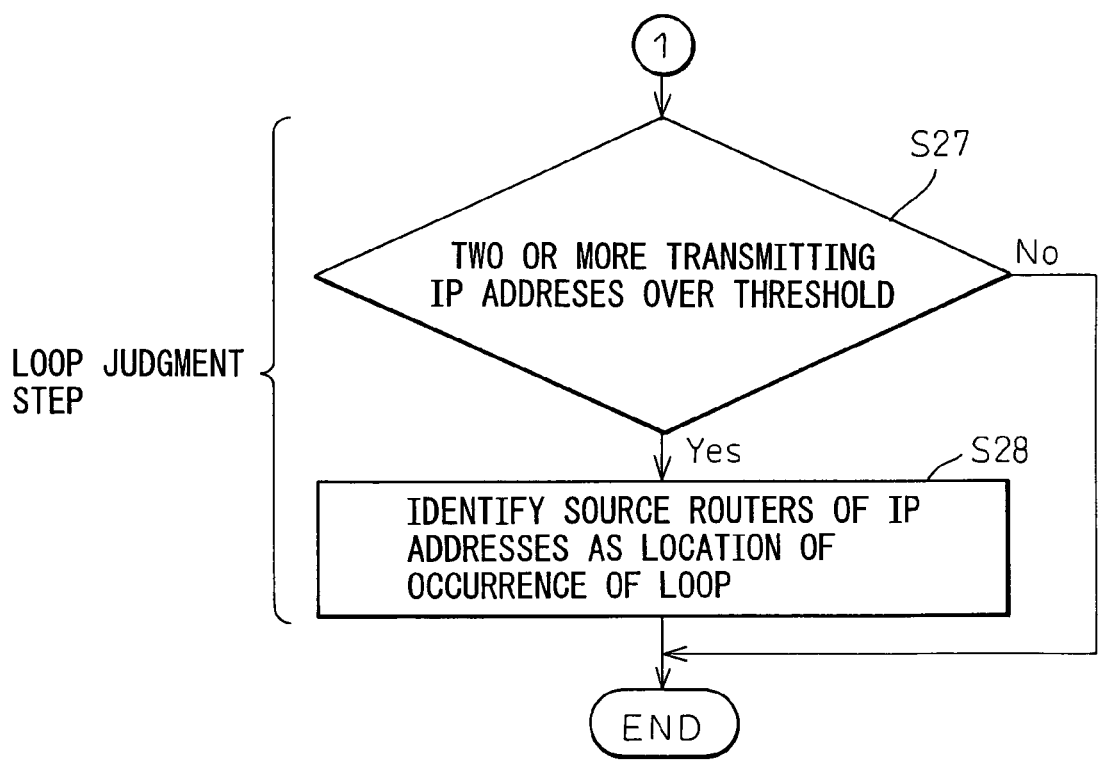
FIG. 9 is a second part of a flow chart of an example of the specific steps based on FIG. 7.

At the judgment step S15, it is judged that the routers (R2, R3) corresponding to the source addresses SA with relatively large cumulatively counted return numbers are the location of occurrence of the Layer 3 loop L. A more specific example of the steps in accordance with these basic steps is explained below:

FIG. 8 and FIG. 9 show a flow chart of an example of the specific steps based on the steps of FIG. 7. First, referring to FIG. 8, Step S21: An ICMP "time exceeded" packet te is received from each router 7.

Step S22: The inspection packet transmission/receiving function unit 3 is notified of the destination IP address to be inspected.

Step S23: The series of inspection packets Pis with TTLs set to X to X+N is successively transmitted.

Step S24: When receiving a return packet corresponding to an inspection packet Pis, it is judged if this is a newly received ICMP "time exceeded" packet te.

Step S25: If a newly received packet, the IP address (SA) of the transmitting router is entered and registered in the table 42.

Step S26: The packet counter is incremented for the IP address ("return count" of FIG. 6).

Step S27: It is judged if there are two or more transmission IP addresses (SA) exceeding the threshold (for example, the above-mentioned "10").

Step S28: If there are two or more, the transmitting routers having these IP addresses (SA) are identified as the location of occurrence of the loop.

Finally, preferred examples of the ICMP "time exceeded" packet and the inspection packet used in the present invention will be explained in detail.

Figure 10:
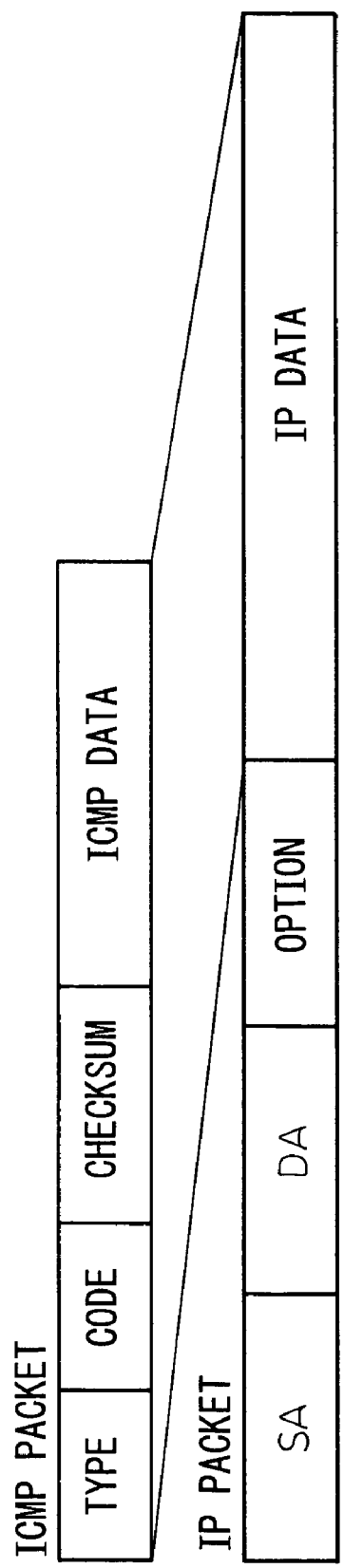
FIG. 10 is a first part of a view of the format of an ICMP "time exceeded" packet.

FIG. 10 and FIG. 11 are views of the format of an ICMP "time exceeded" packet. First, referring to FIG. 10, the bottom shows the format of IP packets forming the "stream" from the camera (1) shown in for example FIG. 4. Among these, the "IP data" forms the ICMP packet. This is shown at the top.

More specifically, this IP packet is shown at the top of FIG. 11. The ICMP packet shown in detail at the bottom of FIG. 11 is contained in the "IP data" region in this. Here, when the "type" and "code" in the ICMP packet at the bottom (also shown at top of FIG. 10) are, as respectively illustrated, "11" and "0", the IP packet becomes an ICMP "time exceeded" packet "te". The source address in the packet "te" ("Source IP Address" at top of FIG. 11) is the IP address of the router causing the loop fault L. This is the source address SA shown in FIG. 6 etc.

Figure 12:
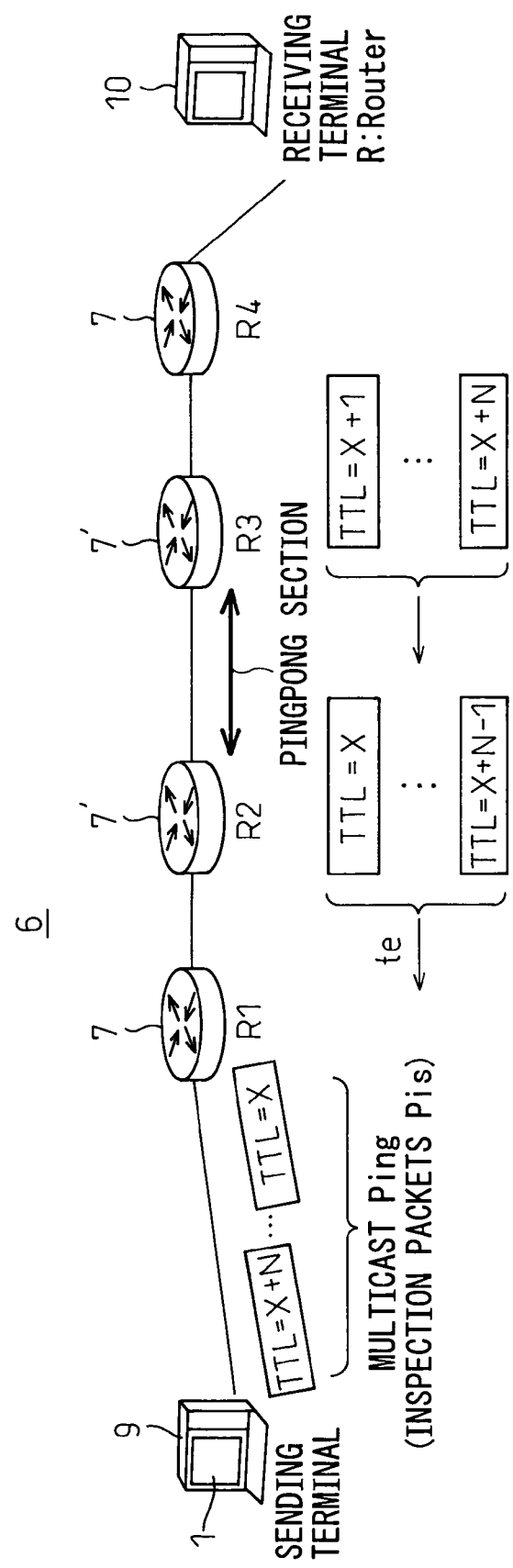
FIG. 12 is a view of a first example of a multicast ping of an inspection packet in FIG. 5.
Figure 13:
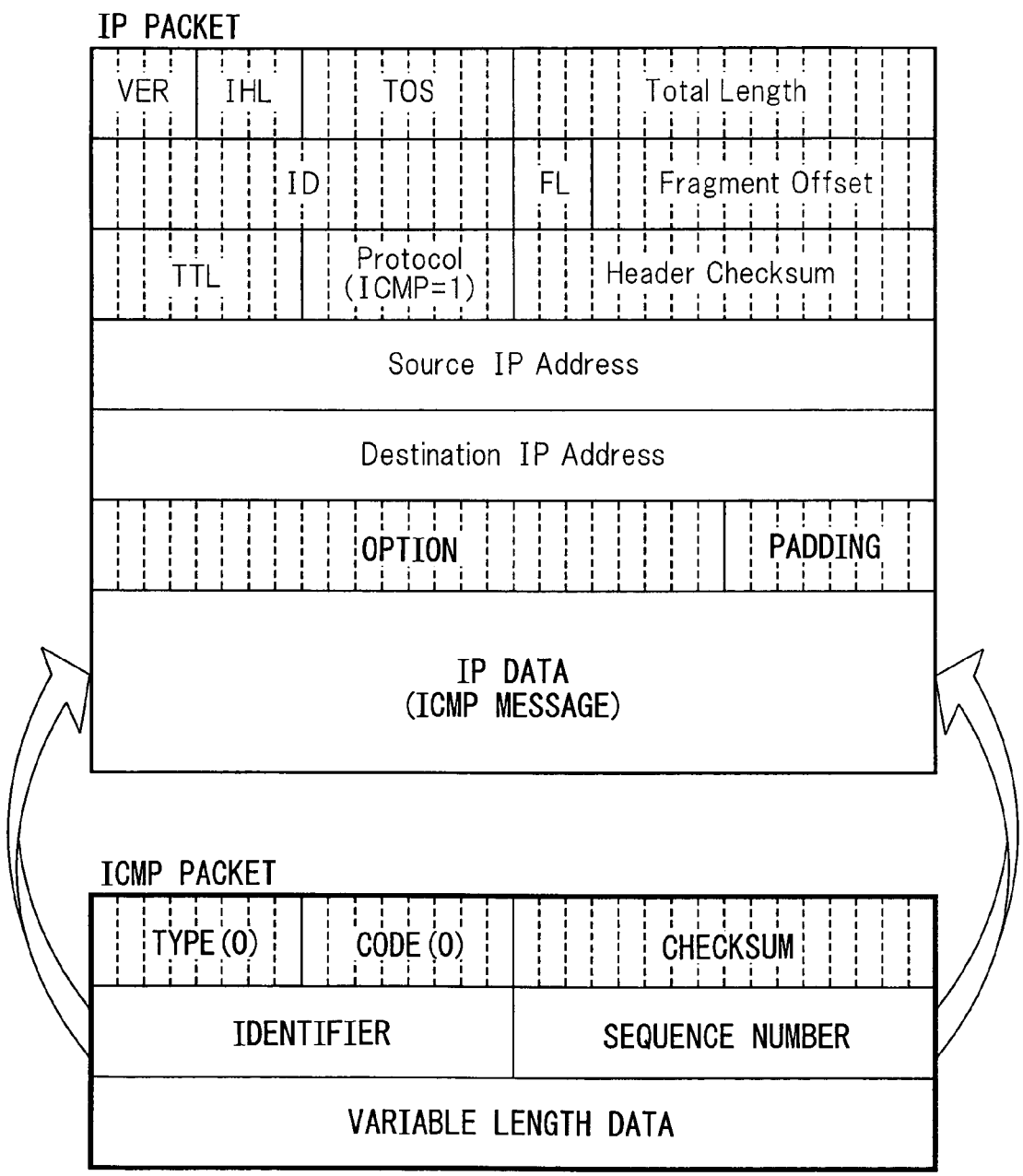
FIG. 13 is a view of the format of a multicast ping.

FIG. 12 is a view of a first example of a multicast ping of inspection packets in FIG. 5. FIG. 13 is a view of the format of this multicast ping. First, referring to FIG. 12, the inspection packet Pis sent from the loop locating apparatus 1 on the left side is a "multicast ping". In the case of a multicast ping packet, the "type" and "code" shown at the bottom of FIG. 13, as illustrated, are "0" and "0". When this ping packet is returned as the "time exceeded" packet "te" to the apparatus 1, the "type" and "code" are reset to "11" and "0". By using the multicast ping, it is possible to identify the location of occurrence of a Layer 3 loop L even when the multicast route differs from the unicast route (see FIG. 17).

Figure 14:
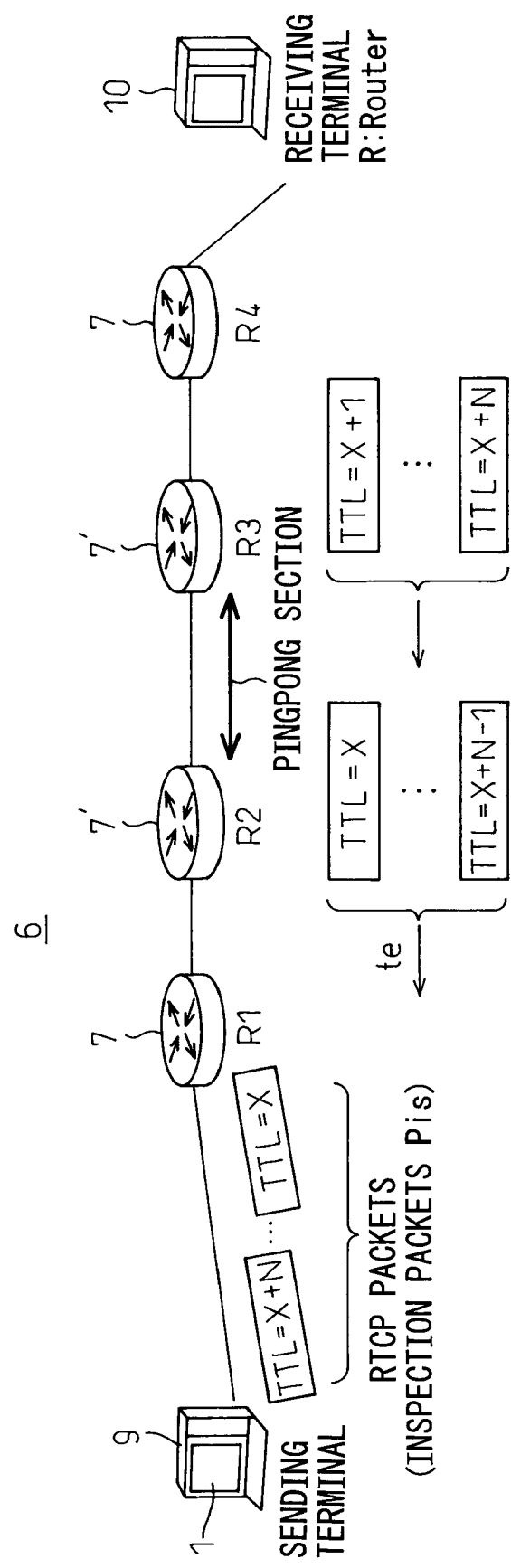
FIG. 14 is a view of a second example of using the inspection packet in FIG. 5 as an RTCP packet.
Figure 15:
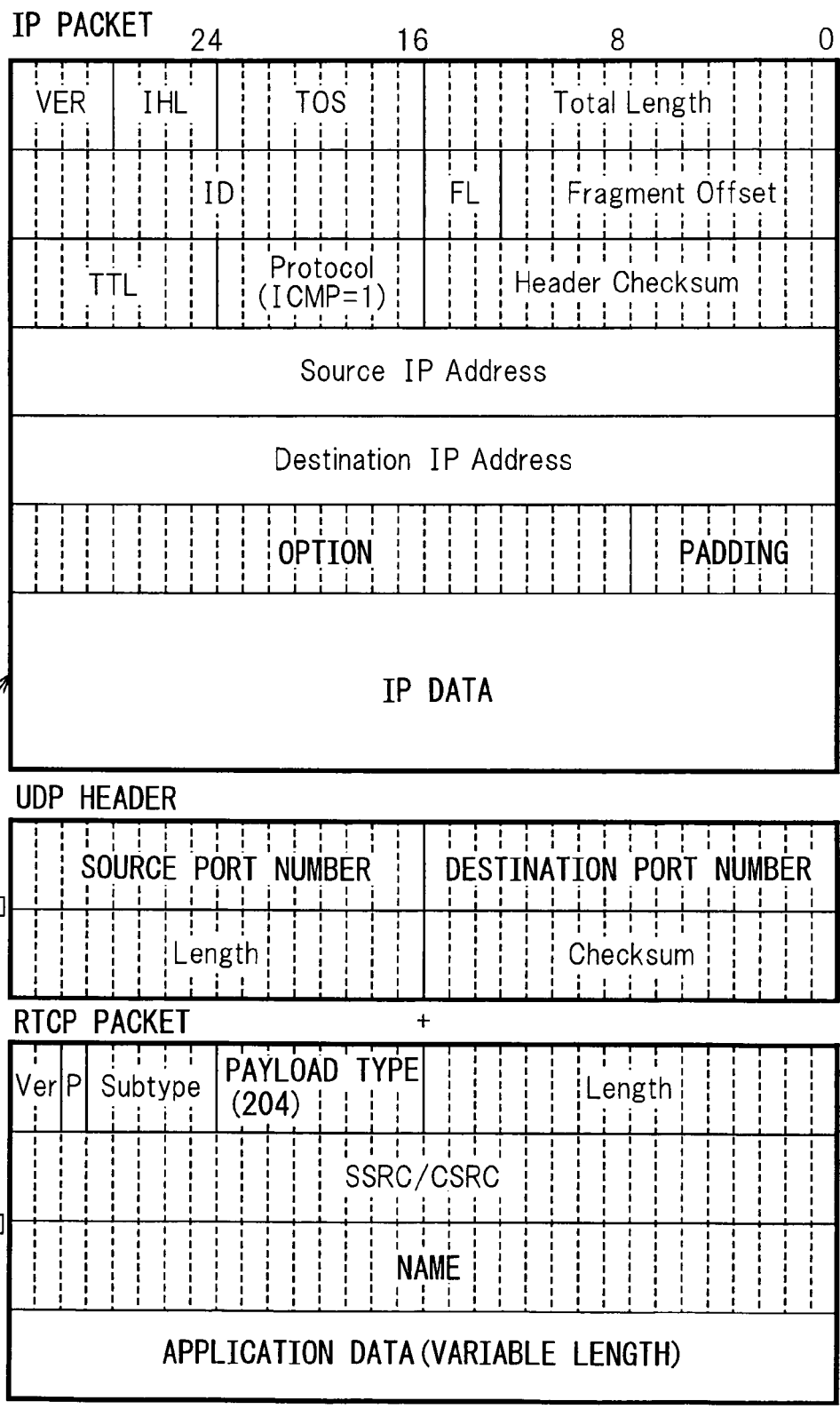
FIG. 15 is a view of the format of an RTCP packet.

FIG. 14 is a view of a second example of making the inspection packets in FIG. 5 RTCP packets. FIG. 15 is a view of the format of an RTCP packet. The second example is one of an example of free use of any application in an RTCP (Real Time Control Protocol) for control of the information packets as they are not specially designated at the present, for example, the APP packet format. By utilizing these RTCP packets, it is possible to identify the location of occurrence of a Layer 3 loop L without having any effect on the quality of the actual stream (see FIG. 4).

As explained above, according to the loop locating technique of the present invention, inspection packets Pis are sent from an apparatus 1 for loop monitoring, the corresponding ICMP "time exceeded" packets are received, and these received packets are analyzed to provide results enabling detection of a loop L. For this reason, even in a network (6) including subnetworks (8) with different administrators, it is possible to detect a loop occurring in the subnetwork at any location regardless of the administrators being the same or different.

Further, since it is possible to detect a loop L by just the loop locating apparatus 1, it is possible to freely broaden the range of monitoring of the network. Therefore, it is possible to greatly shorten the time required for analysis of loop faults and, according to the examples, to identify a location of occurrence of a loop within several minutes.

While the invention has been described with reference to specific embodiments chosen for purpose of illustration, it should be apparent that numerous modifications could be made thereto by those skilled in the art without departing from the basic concept and scope of the invention.

The invention claimed is:

1. A loop locating method for identifying a location of a Layer 3 loop occurring in a Layer 3 network including a plurality of routers, comprising:
    commanding an identification of a location of occurrence of the Layer 3 loop,
    transmitting at least a series of inspection packets with successively incremented TTL (Time to Live) settings for identification of the location of occurrence of said Layer 3 loop,
    cumulatively counting a return number of return packets, returned as said input packets from said layer 3 network, each corresponding to said inspection packets for each of the plurality of routers, and
    deciding loop location by:
        referring to the cumulative return number for each router,
        confirming that said Layer 3 loop has occurred, and
        identifying the routers of the location of occurrence.

2. A loop locating method as set forth in claim 1, wherein said commanding further comprises:
    sending communication confirmation packets to a predetermined plurality of receiving terminals at substantially periodic intervals for confirmation of communication, and
    issuing a command to send said series of inspection packets when judging from the return packets that said Layer 3 loop may have occurred.

3. A loop locating method as set forth in claim 2, wherein said communication confirmation packets are multicast pings (Packet InterNet Groper).

4. A loop locating method as set forth in claim 2, wherein said communication confirmation packets are RTCP (Real-time Transport Control Protocol) packets.

5. A loop locating method as set forth in claim 1, wherein said commanding further comprises issuing a command to send said series of inspection packets when judging from return packets returned during transmission of stream data packets originally to be transferred that said Layer 3 loop may have occurred.

6. A loop locating method as set forth in claim 1, wherein said series of inspection packets transmitted at said transmitting are IP (Internet Protocol) packets and said received input packets are a series of ICMP (Internet Control Message Protocol) "time exceeded" packets corresponding to the series of IP packets.

7. A loop locating method as set forth in claim 6, wherein said inspection packets are multicast pings or RTCP (Real time Transport Control Protocol) packets.

8. A loop locating method for identifying a location of a Layer 3 loop occurring in a Layer 3 network including a plurality of routers, comprising:
    commanding an identification of a location of occurrence of the Layer 3 loop,
    transmitting at least a series of inspection packets with successively incremented TTL (Time to Live) settings for identification of the location of occurrence of said Layer 3 loop,
    cumulatively counting a return number of return packets, returned as said input packets from said layer 3 network, each corresponding to said inspection packets for each of the plurality of routers, and
    deciding loop location by:
        referring to the cumulative return number for each router counted by said return number counting function unit,
        confirming that said Layer 3 loop has occurred, and identifying the routers of the location of occurrence, wherein
    said series of inspection packets transmitted by said transmitting are IP (Internet Protocol) packets with successively incremented TTL (Time to Live) settings and said received input packets are a series of ICMP (Internet Control Message Protocol) "time exceeded" packets corresponding to the series of IP packets, and the values of TTL in the IP packets are set to 1 to K (K is an integer of 2 to less than 256) as default values or are set to incremental values expressed by X+N, where X is any fixed integer, N is an integer incremented one by one, and X+N is an integer less than 256.

9. A loop locating method as set forth in claim 6, wherein said input packet receiving further comprises successively transferring a series of input packets Pin successively received to a return number counting function unit for performing said cumulative counting.

10. A loop locating method as set forth in claim 6, wherein said transmitting notifies said referring to start the loop location decision operation when finishing receiving a series of input packets.

11. A loop locating method as set forth in claim 9, wherein said cumulative counting further comprises analyzing the input packets successively transferred from said input packet receiving to find the source address of the source sending the ICMP "time exceeded" packet forming each input packet from the source address contained in the same and a table for entering the source addresses found and cumulatively counting up the return number for each router on the table.

12. A loop locating method as set forth in claim 11, wherein when the source address found by the analyzing is not in the table, the source address is newly entered into the table, while when the source address found by the analyzing as being already entered in the table, said return number is increased by exactly "1" at that source address.

13. A loop locating method as set forth in claim 11, wherein said loop location deciding further comprises:
  referring to the cumulative return number shown by the table, and
  judging that the Layer 3 loop has occurred at the routers corresponding to the source addresses with relatively larger cumulative return numbers than the rest.

14. A loop locating method as set forth in claim 13, wherein said loop location deciding further comprises:
  deciding that the Layer 3 loop has occurred at two or more routers when there are two or more routers corresponding to source addresses with relatively large cumulative return numbers, and
  identifying the two or more routers relating to the Layer 3 loop.

15. A loop locating method as set forth in claim 13, wherein the loop location deciding further comprises:
  confirming that the Layer 3 loop occurred at two or more routers when judging that the cumulative return number exceeds a predetermined threshold value, and
  identifying the two or more routers relating to the Layer 3 loop.

16. A loop locating method as set forth in claim 11, performed inside a video distributing system or performed by a terminal provided in the same sub network as the video distributing system.

* * * * *